United States Patent [19]

Rodder

[11] Patent Number: 5,642,586
[45] Date of Patent: Jul. 1, 1997

[54] METHOD OF IMPROVING GROWTH CHARACTERISTICS OF PLANTS OF THE FAMILY ORCHIDACEAE

[76] Inventor: Jerome A. Rodder, 775 Sunshine Dr., Los Altos, Calif. 94024

[21] Appl. No.: 417,151

[22] Filed: Apr. 3, 1995

Related U.S. Application Data

[63] Continuation-in-part of Ser. No. 188,046, Jan. 26, 1994, abandoned.

[51] Int. Cl.⁶ .............................. A01G 7/00; C05F 11/10; C05G 3/00
[52] U.S. Cl. .................................. 47/58; 504/353
[58] Field of Search .................. Plt./87.3; 47/58.01, 47/58.09, 58.27, 1.01, DIG. 10, 48.5; 800/200, DIG. 62; 504/353

[56] References Cited

U.S. PATENT DOCUMENTS

| P.P. 2,716 | 2/1967 | McDade | Plt./87.3 |
| P.P. 2,777 | 11/1967 | Fitzgerald | Plt./87.3 |
| P.P. 3,836 | 3/1976 | Lecoufle | Plt./87.3 |
| P.P. 5,688 | 3/1986 | Germaske | Plt./87.3 |
| 3,472,647 | 10/1969 | Miller | 71/122 |
| 3,915,686 | 10/1975 | Miller | 504/353 |

OTHER PUBLICATIONS

Cochran et al. 1957. Experimental Designs. Second Edition. John Wiley & Sons, Inc., pp. 11–14.
Gomez et al. 1984. Statistical Procedures for Agricultural Research. Second Edition. John Wiley & Sons, Inc. pp. 188–215.
Curtis. 1950. Orchids. Putnam & Company, Ltd. pp. 45–46.
Black. 1980. Orchid Growing. Times Books. pp. 41–43.
Bowen. The Art and Craft of Growing Orchids. 1976. BT Batsford Ltd. pp. 45–57.

*Primary Examiner*—Erich E. Veitenheimer
*Attorney, Agent, or Firm*—Christie, Parker & Hale, LLP

[57] ABSTRACT

A method of improving growth characteristics of orchid plants by applying alcohol to the orchid plant roots.

**3 Claims, 11 Drawing Sheets
(11 of 11 Drawing(s) in Color)**

METHOD OF IMPROVING GROWTH CHARACTERISTICS OF PLANTS OF THE FAMILY ORCHIDACEAE

CROSS-REFERENCE TO RELATED APPLICATION

This is a continuation-in-part of Ser. No. 08/188,046, filed Jan. 26, 1994, now abandoned.

FIELD OF THE INVENTION

The present invention relates to a method of improving the growth characteristics of plants of the Orchidaceae, also known as the orchid, family. More particularly, the invention relates to a method of improving the growth characteristics of an orchid plant by applying alcohol or glycine to the plant roots.

BACKGROUND OF THE INVENTION

Orchid plants have been appreciated for many years for the large variety of beautiful flowers which they produce. The popularity of orchids has been increasing due to increasing numbers of orchid growers, both commercial and amateur, who share with the public at large an appreciation for the unique and unusual orchid flowers. Commercial orchids are typically of tropical origin although some may originate from high elevations and many are hybrids of naturally occurring species and varieties. Many orchids are epiphytes growing on tree tops and some are terrestrial. Principally, the more popular orchids are of the genera: Brasabola, Calanthe, Cattleya, Coelogyne, Cymbidium, Dendrobium, Epidendrum, Laelia, Lycaste, Miltonia, Odontoglossum, Oncidium, Paphiopedilum, Phalaenopsis and Vanda.

The growth and culture of orchid plants requires careful observation and adaptability of cultural conditions by the grower. A difference of as little as two or three degrees in temperature or a change in humidity or a variation in watering or available light may make the difference between satisfactory and unsatisfactory orchid plant growth and results.

The warmest species of orchids prefer a temperature of not less than 65°–70° F. at night and a day temperature near 80° F. Cool-growing orchids prefer night temperatures in the range of 50°–55° F. and day temperatures of 65°–70° F. Certain orchid varieties prefer intermediate ideal night temperatures of 60° F. and day temperatures of 65°–70° F. The table below shows the ideal temperatures for various orchids, but ranges of temperatures, as discussed below, are applicable for most varieties in these groups.

TABLE 1

| TYPE | NIGHT TEMPERATURE | DAY TEMPERATURE | SUNNY DAY TEMPERATURE |
| --- | --- | --- | --- |
| COOL | 55 | 60–65 | 70 |
| INTERMEDIATE | 60 | 65–70 | 75 |
| WARM | 65 | 70–75 | 80 |

Extreme high temperatures, such as would result from direct exposure to sun under summertime conditions, will frequently injure or destroy orchid plants and should be avoided.

So-called "warm-growing" orchid plants generally grow in the tropics, usually at sea level or at low altitudes, and flower best where there are minimum night temperatures of about 65°–75° F. Orchids considered "intermediate-growing" prefer night temperatures of 55°–60° F. during the winter months, but slightly higher in the summer. The group of orchids known to be "cool-growing" are generally from medium to high altitudes in the tropics, where they flower best with a minimum night temperature of 50°–55° F. during the winter months.

Although orchids have a relatively wide range of light requirements, all orchids generally have a light and temperature limit above which they will not thrive or perform best. These limitations require use of light and temperature control when grown for commercial purposes. It is often desirable to have some form of shading over orchid plants during the brightest summer months. Such shading not only reduces the amount of light, but also provides a means of reducing the temperature to which the plants are exposed.

Among the various advantages of the present invention is the ability to produce earlier flowering, more new shoots and increase the tolerance for brightness and high temperatures in orchid plants, as well as to improve root development and produce attractive, glossy or shiny foliage.

SUMMARY OF THE INVENTION

In accordance with the present invention there is provided a method of improving growth characteristics of orchid plants which comprises applying to the roots of such plants a solution containing alcohol, preferably methanol, or glycine, and repeating the application at intervals until growth characteristics are improved. Preferably, the methanol is applied as an aqueous solution of from about 0.01% to about 5%, by volume, methanol. Advantageously, the methanol may be applied along with fertilizer to the roots of the orchid plants.

The application of methanol to the orchid plant roots produces earlier flowering and more shoots and increases high temperature tolerance, root vigor, bright light tolerance and foliage glossiness or shininess.

The invention is also directed to orchid plants which have been subjected to the methanol application to roots. This produces a novel orchid plant having a more vigorous or greater root system than that of an orchid plant of equivalent size, age and variety to which there has been no application of methanol to the plant roots. Similarly, the invention is also directed to orchid plants having, respectively, earlier flowering, more shoot production, increased high-temperature tolerance, increased bright-light tolerance and increased foliage glossiness, as compared to plants of equal size, age and variety to which no methanol has been applied to the plant roots.

BRIEF DESCRIPTION OF THE ILLUSTRATIONS

The file of this patent contains at least one drawing executed in color. Copies of this patent with color drawing(s) will be provided by the Patent and Trademark Office upon request and payment of the necessary fee.

The advantages of the invention will be more apparent by reference to the accompanying illustrations, in which:

FIGS. 1–12 are photographic illustrations all taken on Dec. 15, 1993, as follows:

FIGS. 13–21 are photographic illustrations all taken on Dec. 6, 1994, as follows:

DETAILED DESCRIPTION

To determine the effect of the application of methanol on orchid plants, in May 1993 a very dilute aqueous solution of 0.01% methanol was added to a standard fertilizer solution and applied to orchid plant roots by saturating the fir bark growing media. Since no damage to the plant was observed, a 0.1% solution of methanol was subsequently applied 10 days later to the same plant. Again, no toxic effects were seen.

In June 1993, a solution of 0.17% methanol with half-strength standard fertilizer ("Dynagro" 10-5-5, ¼ tsp/gal) was applied to approximately 500 orchid plants at weekly intervals. Starting in August, the solution concentration was doubled (to ½ tsp/gal) and subsequently two plants were treated with full-strength fertilizer with increasing percentages of alcohol to 5% methanol without any toxic effects.

Figure 1:
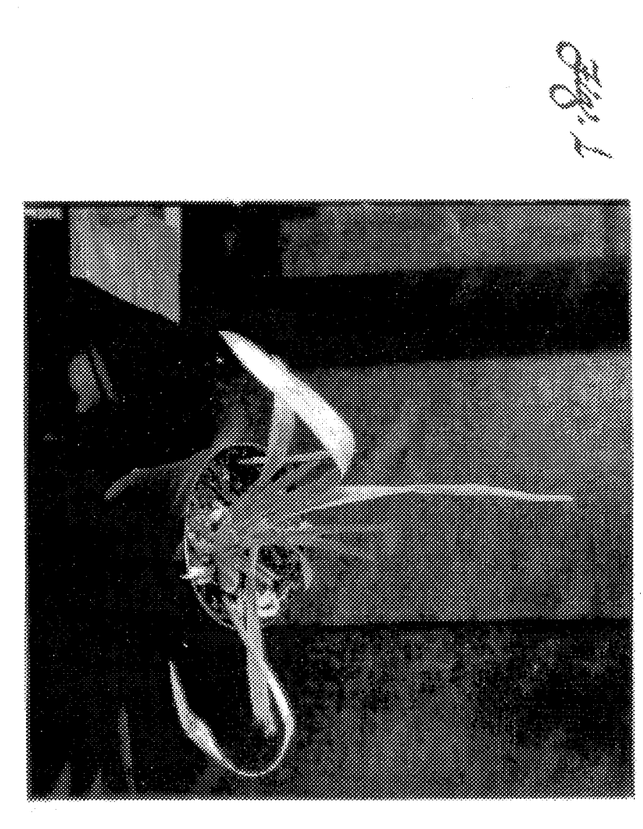
FIG. 1 shows a plump glossy bulb.

Typically, orchids are slow-growing plants that may take five to six years to bloom from seed. However, results showed that the methanol treatment enhanced the blooming period so that blooming took place in 19 months' time, as opposed to a typical period of three to four years for plants of that same size (according to information provided by the supplier) when no methanol treatment is applied. A plump glossy bulb is shown in FIG. 1.

Figure 2:
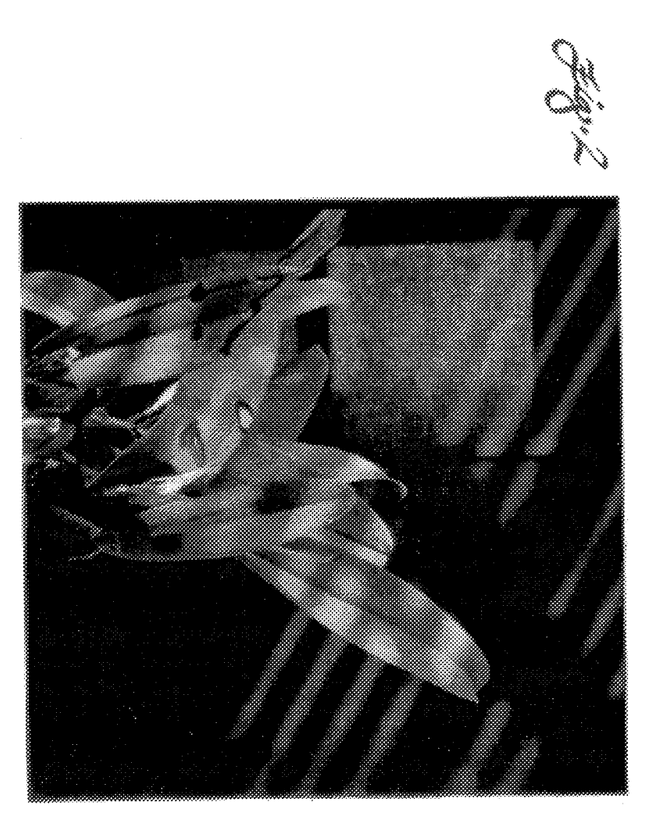
FIGS. 2, 3 and 4 show orchid plants having both dull foliage and shiny foliage which resulted following the application of methanol.
Figure 3:
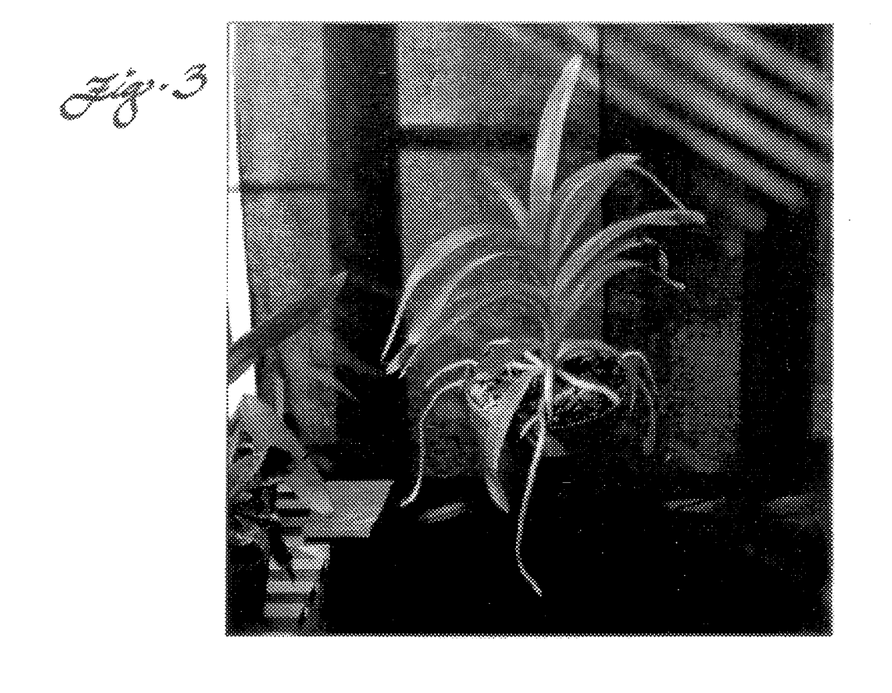
Figure 4:
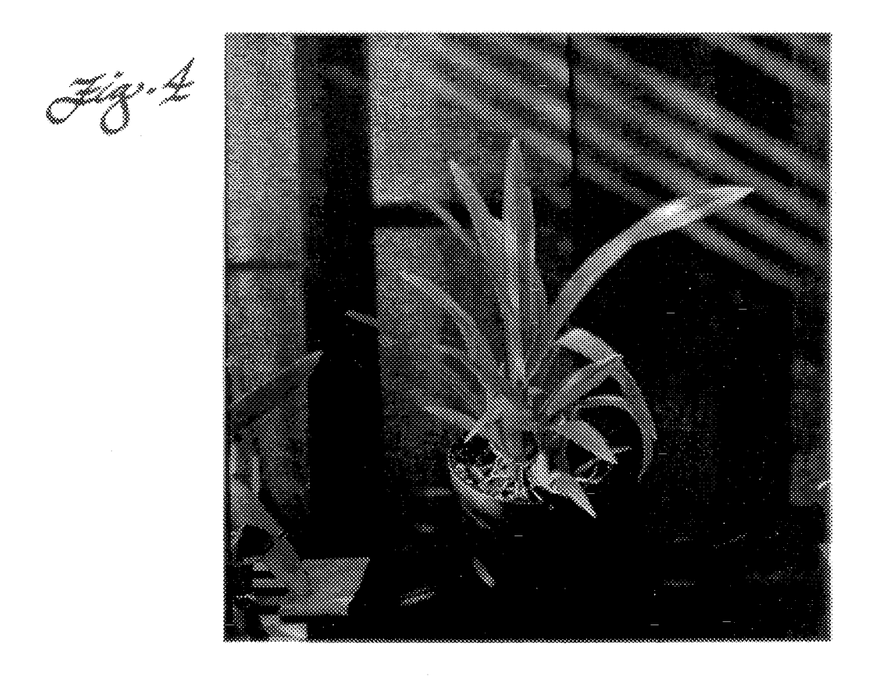

It was first observed that leaves from growing shoots were a different green color after the application of methanol. It was also noted that the result was an appearance as if polish had been applied to the foliage. The glossiness or shininess lasted about one to two months after the application of methanol and eventually the leaf color changed and reverted to the usual dullness, but frequently a lighter color than plants not treated with methanol. Nonetheless, the pseudobulbs, i.e. the lower mature section of growth, remained plump and shiny green for many months longer and there was no change in the older leaves. The improved color and glossiness is shown in FIGS. 2, 3 and 4.

Figure 5:
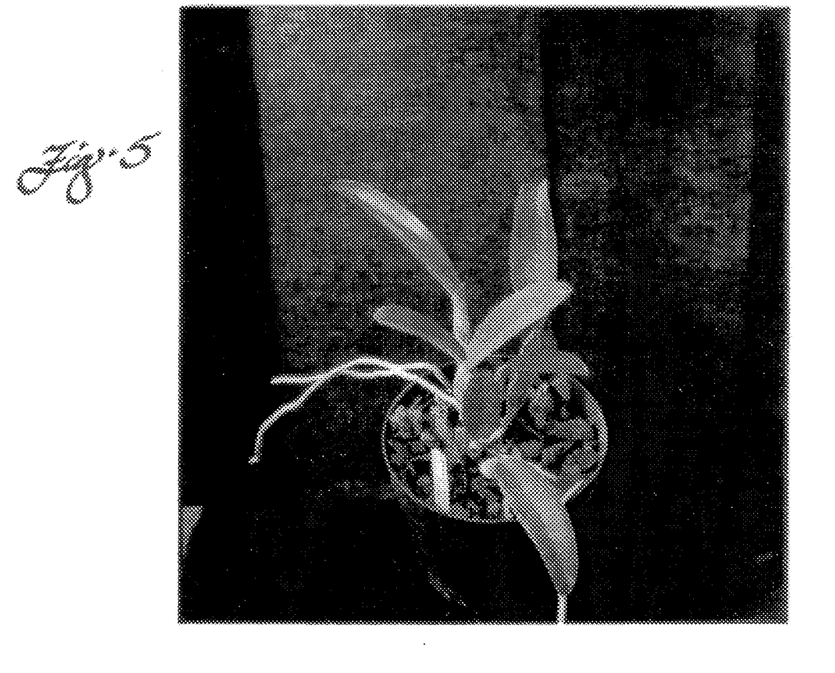
FIG. 5 shows an orchid plant having green shoots growing from previously almost-dead plants.
Figure 6:
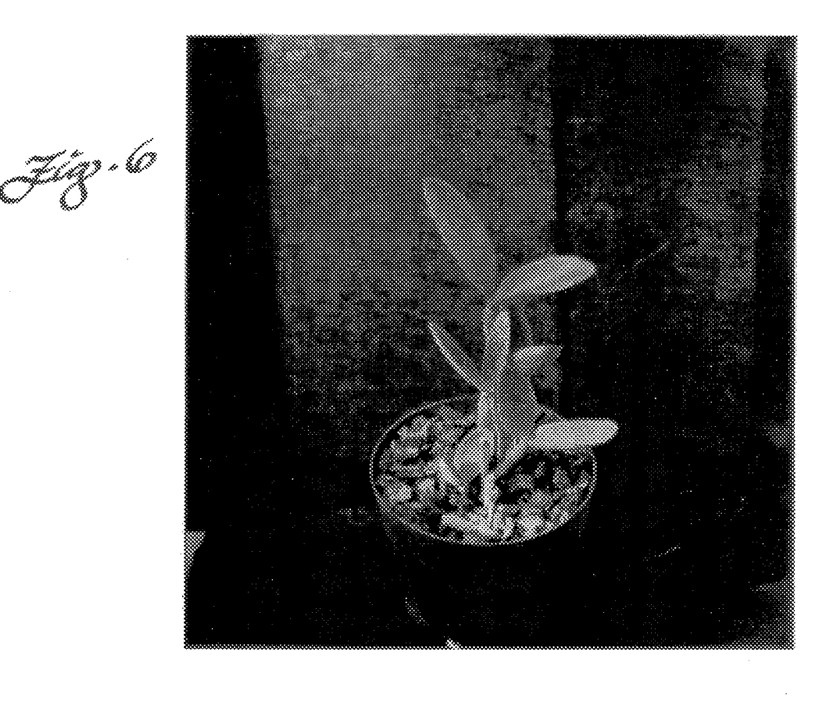
FIGS. 6 and 7 improved foliage development following application of methanol to plant roots.
Figure 7:
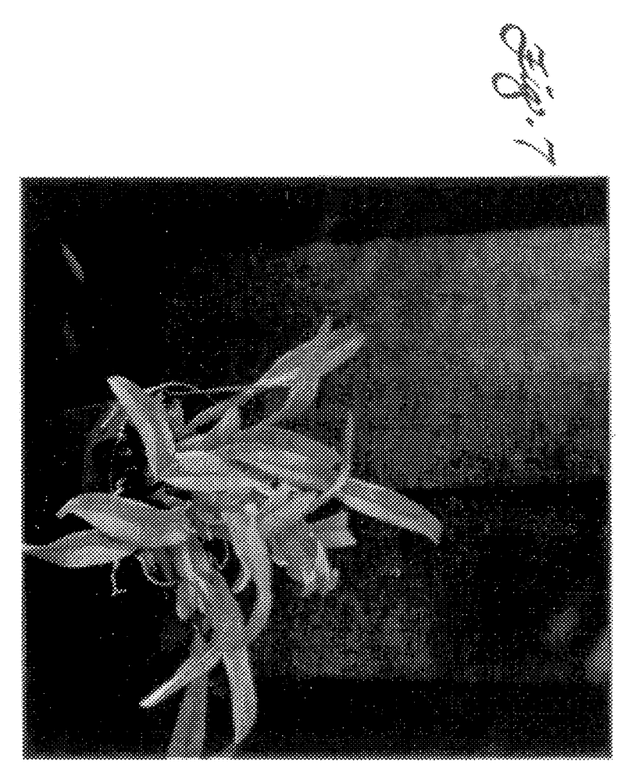

One plant which had been growing poorly and had not flowered in three years developed a taller inflorescence, i.e. a new growth stem, with beautiful leaves and also flowered following the application of the methanol. Other plants which had been dormant for many years also had new shoots and all the leaves were shiny; see FIGS. 5, 6 and 7.

Oftentimes, the temperature inside a greenhouse is less than ideal and all orchid types are usually grown at about the same temperature. However, some plants receive more direct sun than others. Plants in direct sun, even warm-growing Cattleyas, develop black leaves from the effects of too much sun, which also produces high temperatures. The intermediate-temperature orchids, e.g. Paphiopedilums, which had not grown in three years, displayed roots that were rotting and leaves that were almost totally brown. The cool growing orchids, e.g. Masdevellias, were also in very bad condition.

Figure 8:
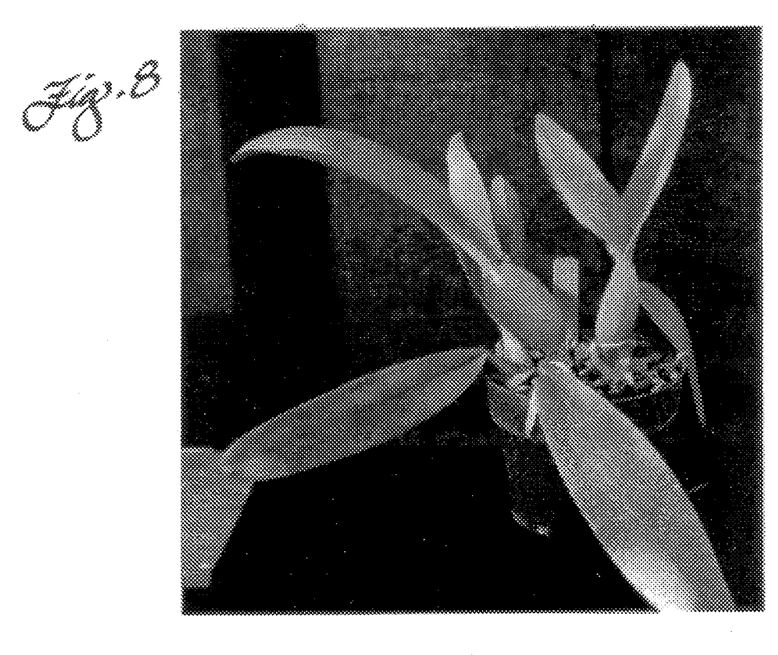
FIGS. 8 and 9 show plants having both leaves from direct exposure to the sun and green leaves.
Figure 9:
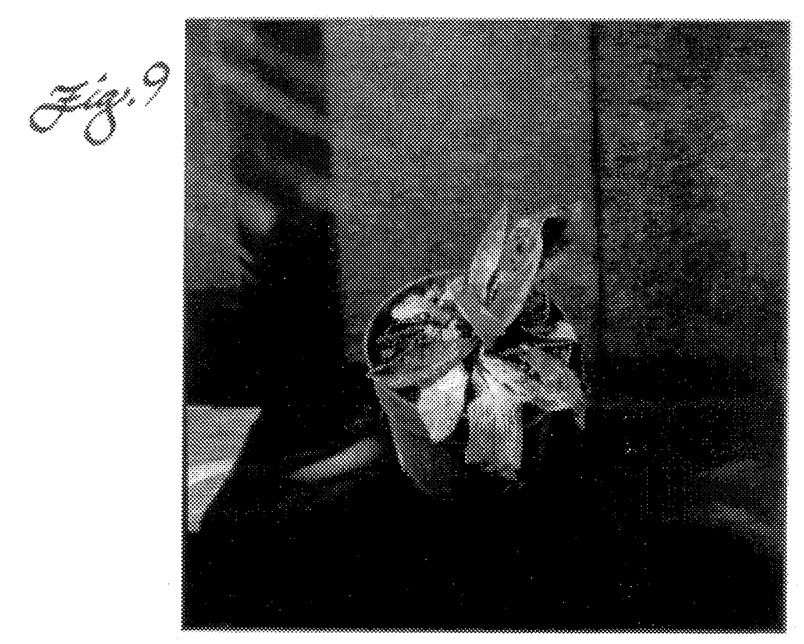
Figure 10:
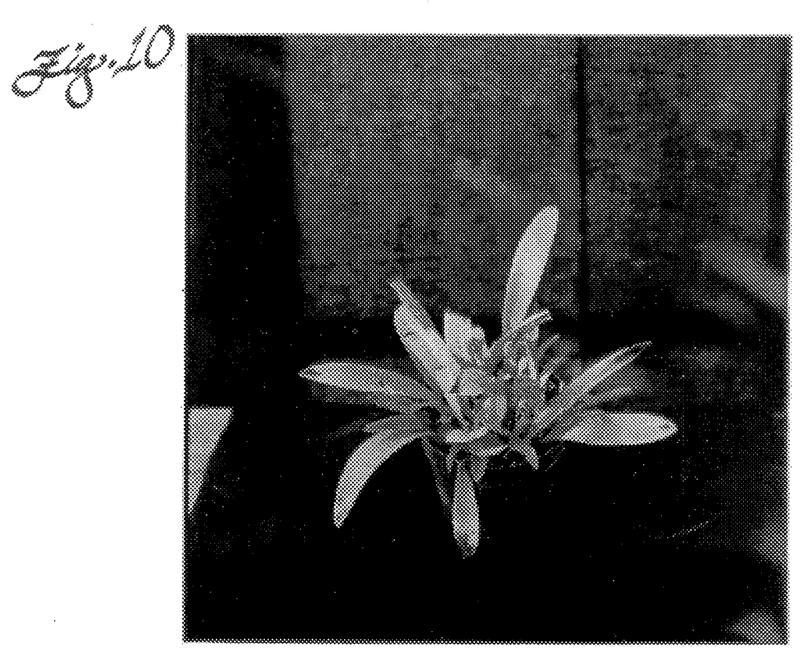
FIG. 10 shows an orchid plant having the green leaves among bleached and brown older leaves on a plant exposed to 100° F.

During one period time in which outdoor afternoon temperatures reached 102° F. on many days (higher temperatures in the greenhouses) and even temperatures of 100° F. (in the greenhouse) during the morning hours, plants to which the methanol had been applied to the roots continued to flourish and developed shiny green foliage coloration. The methanol-treated plants also produced new and vigorous root growth on various orchid plants, e.g. Cattleyas, Dendrodiums and Vandas. After a few months, small shoots appeared among the dead leaves of the Paphiopedilums, along with new root growth. One Masdevallia plant endured many days when the temperature was least 100° F. yet the growth was remarkable. The ability for this orchid plant to survive 100° F. temperatures is extraordinary. The improved resistance to high or elevated temperatures is shown in FIGS. 8, 9 and 10.

Figure 11:
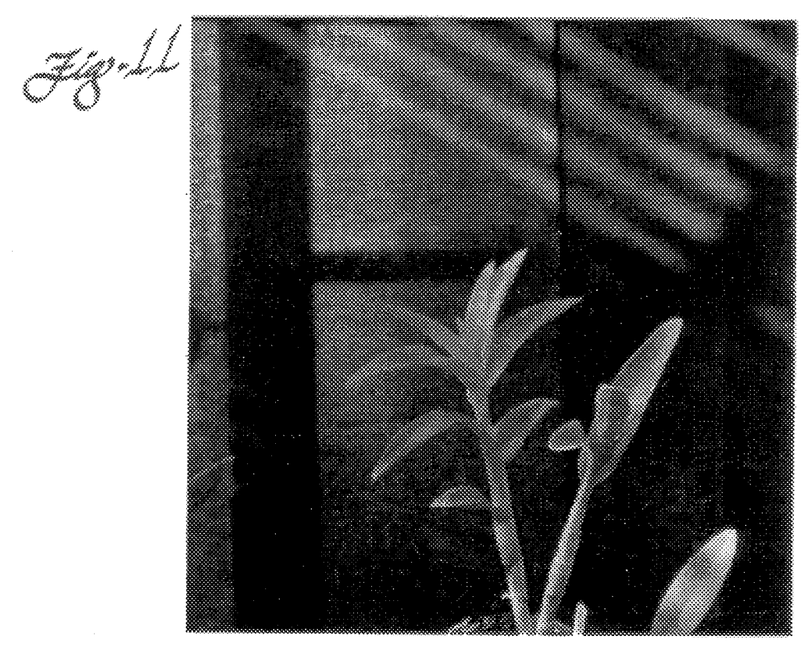
FIGS. 11 and 12 show orchid plants with vigorous root systems.
Figure 12:
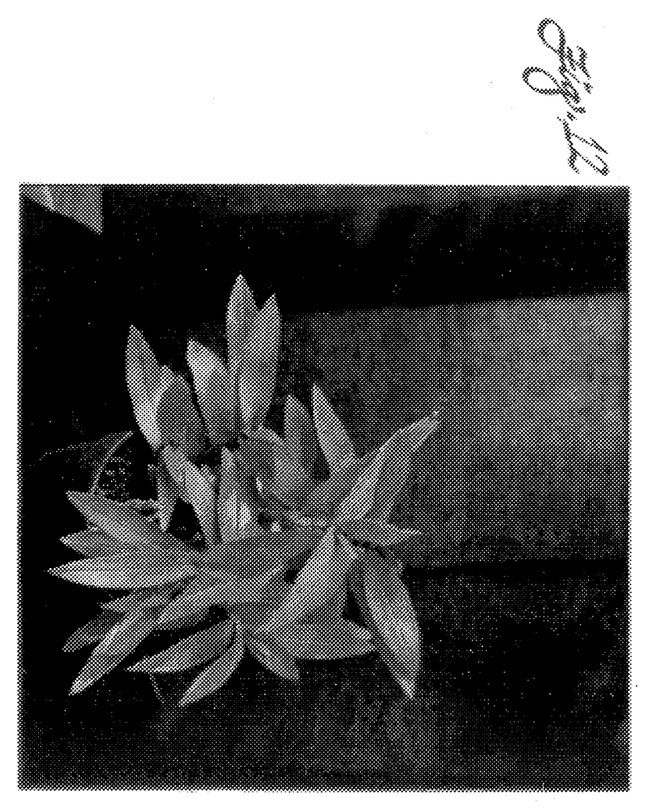
Figure 13:
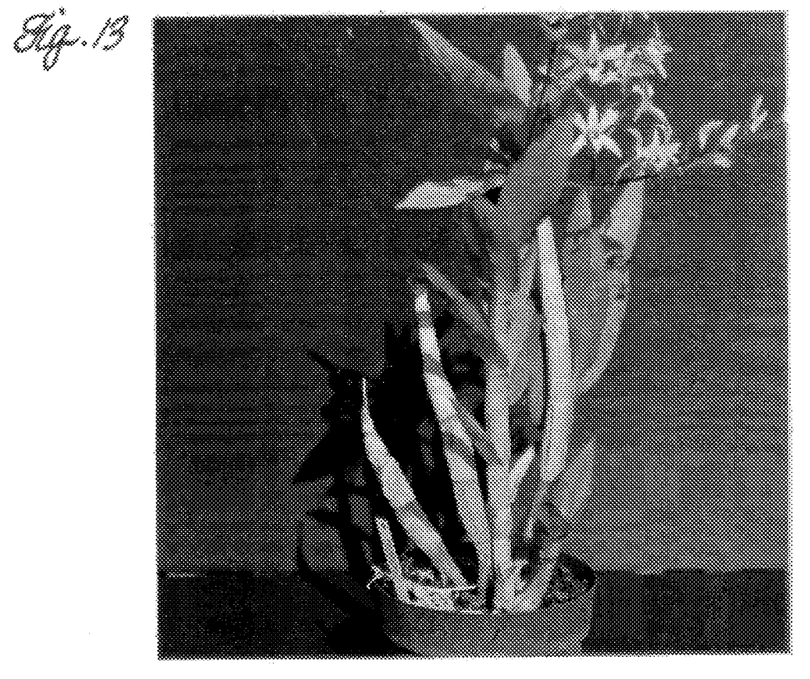
FIGS. 13–19 show the development of orchid plants in pot numbers 1 through 7, respectively, in a controlled study showing the effects of adding methanol to a fertilizer containing formulation applied to the roots of the plants.
Figure 14:
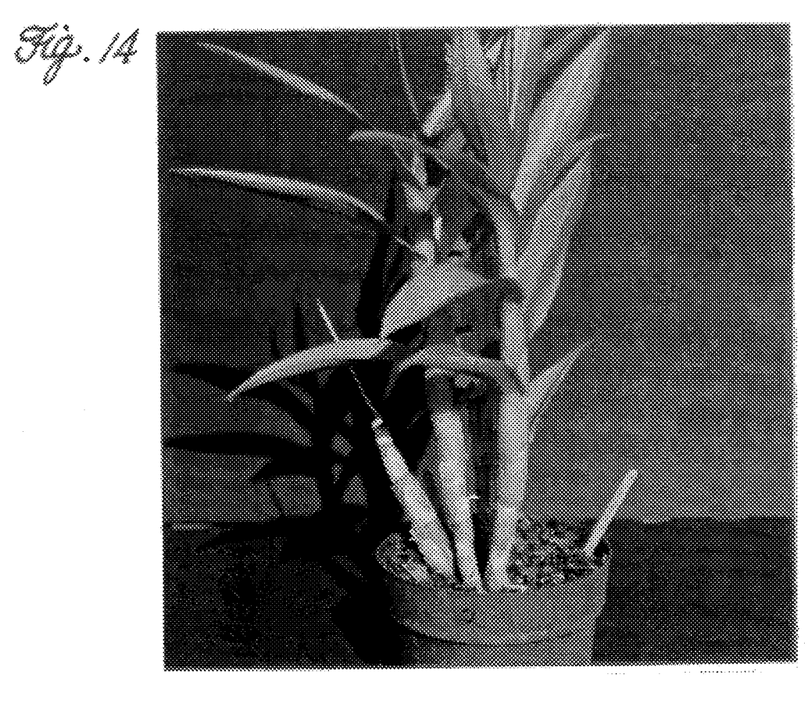
Figure 15:
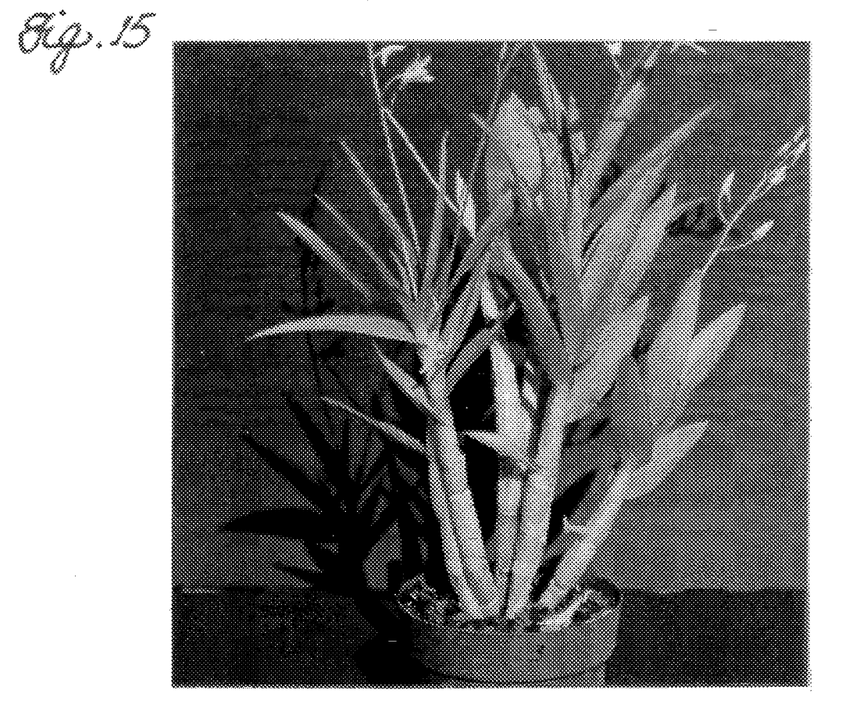
Figure 16:
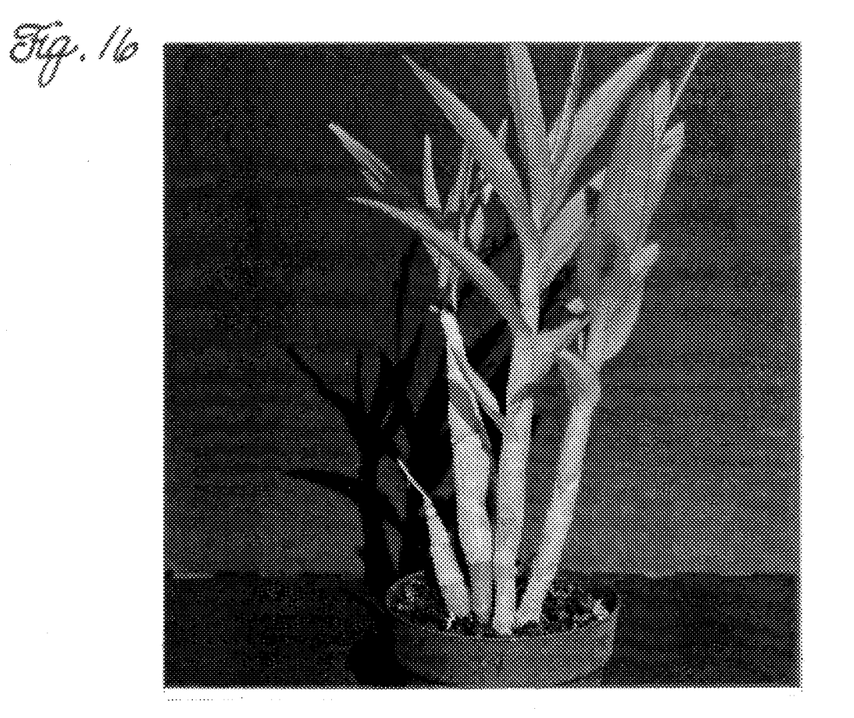
Figure 17:
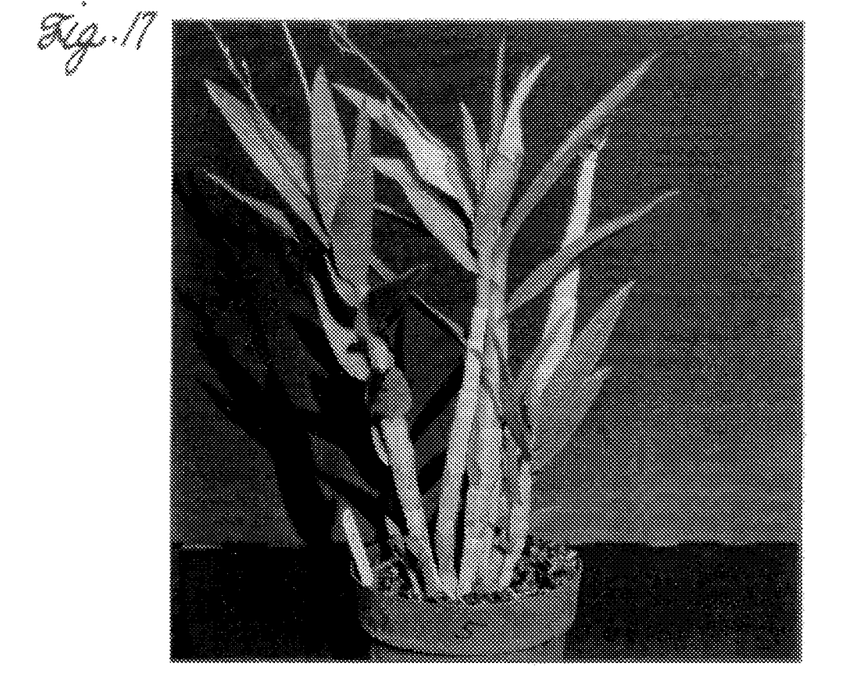
Figure 18:
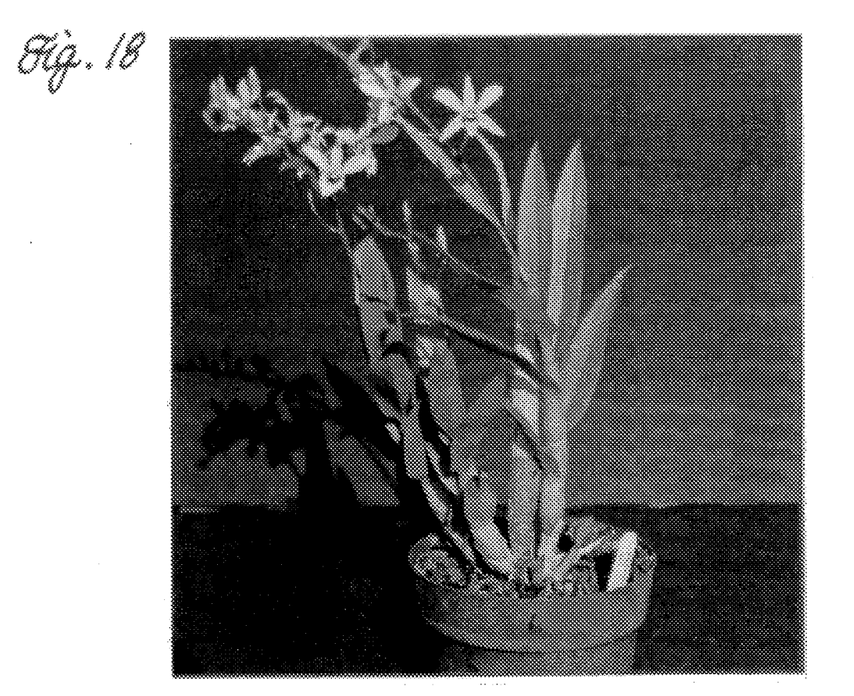
Figure 19:
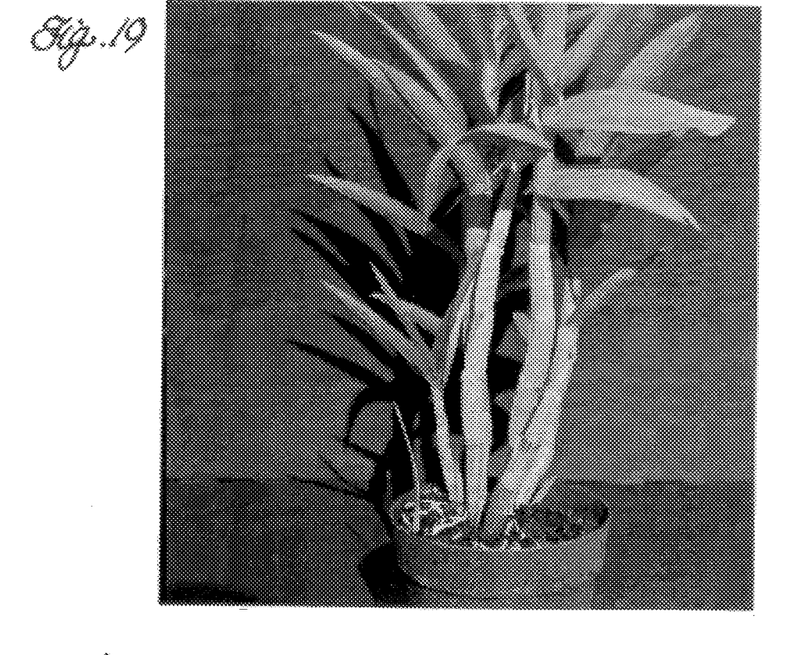
Figure 20:
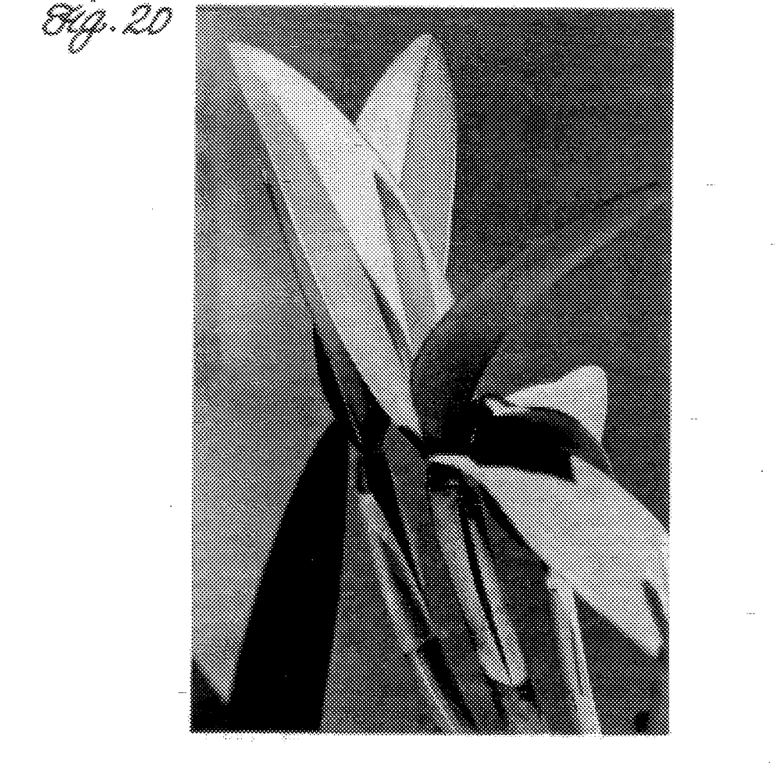
FIGS. 20 and 21 show the development of a methanol treated Cattleya orchid plant.
Figure 21:
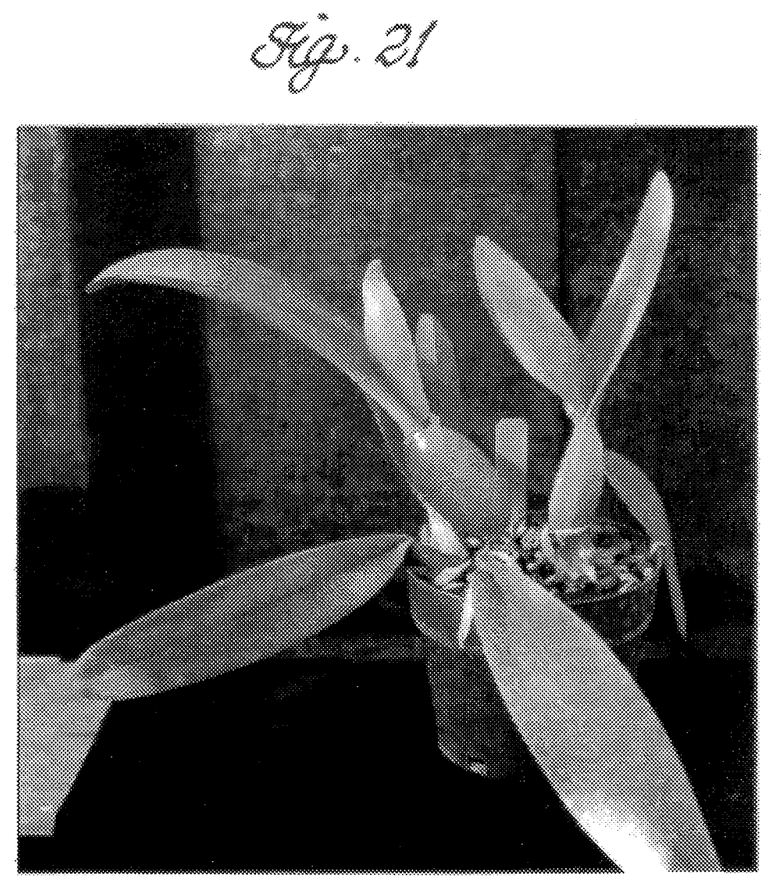

Some Cattleyas proved to be more vigorous growers than others but all plants improved following the methanol treatment. In one mature plant, which had previously sent out one or two growth shoots per year, seven new shoots were produced following application of methanol to the root system. Another plant which was also a slow grower developed four shoots in the summer and six shoots in the fall. The improved root system and root development is shown in FIGS. 11 and 12.

The application of the alcohol, e.g. methanol, to the roots at relatively low concentrations makes the alcohol available over a long period of time in the potting media and at a continuous low concentration.

EXAMPLES

In September 1993 seven similar orchid plants (of the Dendrobium Carol Takunga "Hiroshi" variety) were repotted in 6" plastic pots to study the effects of methanol added to a typical orchid fertilizer and applied to the roots of the potted plants. It was decided to give the two largest plants regular fertilizer without methanol so as not to bias the study in favor of the methanol treated plants. These plants (contained in pot nos. 1 and 2, described below) were larger, more mature plants before the test was initiated than the other plants (pot nos. 3–7). Depending on the weather, the plants were watered uniformly every 5 to 14 days; for most of the year watering frequency was once a week. Plants were given fertilizer (with and without methanol) one day after watering. Maximum daily temperatures ranged from 60–115 degrees F.

The following table describes the different fertilizer formulations used in the comparative tests and the results of the tests to date. Orchids grow slowly and sometimes require a year to establish. Next year is expected to show more dramatic results.

| Pot No. | Fertilizer | Methanol | Glycine |
| --- | --- | --- | --- |
| 1 | 5 | 0 | 0 |
| 2 | 10 | 0 | 0 |

-continued

| Pot No. | Fertilizer | Methanol | Glycine |
|---------|------------|----------|---------|
| 3 | 5 | 5 | 0 |
| 4 | 5 | 10 | 0 |
| 5 | 10 | 5 | 0 |
| 6 | 10 | 10 | 0 |
| 7 | 10 | 0 | 4 |

(1) The fertilizer was commercially available "Dynagro."
(2) Fertilizer and methanol amounts were in cc per 4 liters.
(3) Glycine amounts were in gm per 4 liters.
(4) Starting 12/5/93 #7 has 5 cc Dynagro + one gm per liter.

The following table summarizes the growth development of the plants contained in pots 1–7.

| Pot No. | 1 | 2 | 3 | 4 | 5 | 6 | 7 |
|---------|---|---|---|---|---|---|---|
| (1) No. shoots without leaves 9/93 | 2 | 2 | 2 | 2 | 2 | 2 | 0 |
| (2) No. shoots with leaves 9/93 | 1 | 1 | 1 | 1 | 1 | 1 | 2 |
| (3) No. new shoots 8/94 | 2 | 2 | 5 | 2 | 3 | 3 | 3 |
| (4) No. new shoots 11/94 | 2 | 0 | 0 | 0 | 5 | 4 | 3 |
| (5) Total new shoots 1994 (lines 3 + 4) | 4 | 2 | 5 | 2 | 8 | 7 | 6 |

FIGS. 13–19 are photographic illustrations, all taken on Dec. 6, 1994, showing the plants contained in pots 1–7, respectively. Summarizing the table for pots 1 through 7, the comparative test results quantitively show significantly improved growth of new shoots when compared with plants not containing methanol. Although the plants used in this test were taken from the same batch provided by the supplier, test results varied quantitatively from plant to plant because of the inherent differences in the plants.

This was a controlled study showing the effects of adding methanol to a fertilizer containing formulation applied to the roots of orchid plants during their early growth period. The particular variety involved in this study is a slow growing plant that typically takes about five to seven years to mature. The plants were all potted in fir bark which is pure mulch with essentially no nutrients. The fertilizer was used in all pots in order to provide the necessary nutrients. The methanol added to the fertilizer formulation provided remarkably improved growth measured by the number of new shoots that developed on the plants. The plants in pots 1 and 2 produced reasonably good growth but were substantially larger plants to begin with than the plants in pots 3 through 7.

The amount of methanol added to the fertilizer/water formulation can vary. I have found that up to 5 percent methanol in a standard solution of fertilizer (5–10 cc fertilizer per 4 liters (approximately 1 gal.) of water) produces significantly improved growth when compared with the addition of no methanol to the formulation. The larger amount of methanol (approximately 5 percent or 200 cc per 4 liters) surprisingly produces no toxic results. However, the preferred amount of methanol is substantially less and is about 5 cc per 4 liters standard fertilizer solution because essentially the same improved growth characteristics are produced with the smaller (and therefore less costly) amount of methanol.

Even with orchid plants grown under similar conditions to those shown in the comparative study grown in conditions in which the indoor temperature reached 115° F. and there was some burning of the leaves, six plants all treated with the methanol/fertilizer formulation received first place honors in a local amateur orchid growing judging held in March of 1995.

In addition, a variety of orchid known as phalaenopsis (moth orchid) was treated with the methanol/fertilizer formulation and surprisingly developed vegetative growth (a shoot from the bottom of the plant which becomes a new plant) in addition to flowering which, according to an orchid expert, rarely happens with this variety of plant.

In one test to determine the effect of ethanol as substitute for methanol in this invention, 5 cc ethanol and 5 cc of fertilizer in 4 liters water were applied to the root system of a potted orchid plant of the Cattleya variety. The ethanol showed no enhancement of plant growth compared to ordinary fertilizer.

What is claimed is:

1. A method of improving the flowering, shoot growth and glossiness of the foliage of an orchid plant which comprises applying to the roots of said plant an aqueous solution containing methanol together with a fertilizer and repeating said application at intervals during the growth cycle of the plant.

2. A method according to claim 1 wherein the methanol is applied as an aqueous solution of from about 0.01% to about 5% methanol, by volume.

3. The method according to claim 1 in which the orchid plant is selected from the group consisting of the cattleya, dendrodium, vandas, paphiopedilum, masdevellia and phalaenopsis varieties of orchids.

* * * * *